United States Patent Office 2,883,418
Patented Apr. 21, 1959

2,883,418

ACRYLIC ACID ESTER PRODUCTION

Walter Reppe, Ludwigshafen (Rhine), and Robert Stadler, Heidelberg, Germany, assignors to Badische Anilin- & Soda-Fabrik Aktiengesellschaft, Ludwigshafen (Rhine), Rhineland-Pfalz, Germany No Drawing. Application November 12, 1954
Serial No. 468,580

Claims priority, application Germany November 14, 1953

14 Claims. (Cl. 260—479)

The present invention relates to the production of acrylic acid esters by the carbonylation of acetylene in the presence of alcohols, and more particularly to a method of producing acrylic acid esters in an inert organic solvent with an activating carbonylation catalyst.

It has already been proposed to produce acrylic acid esters by bringing acetylene and carbon monoxide into contact with alcohols and an inert organic solvent in the presence of compounds of metals of the iron group while applying superatmospheric pressure and elevated temperatures. A preferred type of catalyst for this reaction has been nickel in combination with halogens, in particular nickel bromide and iodide.

While this synthesis was carried out with fairly satisfactory results, there has been observed a tendency that part of the starting material used was transformed into undesired products. The activity of the catalysts so far used was found to decrease relatively fast thereby reducing the rate of conversion, in particular when converting higher alcohols and phenols.

It is an object of the present invention to avoid these disadvantages. It is a more specific object to increase and maintain the activity of the catalyst in this reaction. Other objects will be evident from the following description of our invention.

We have found that in carrying out the carbonylation of acetylene in the presence of alcohols it is very advantageous to use an excess by volume of an organic solvent which is inert to acetylene under the reaction conditions and miscible with alcohols. We have further found that the amount of the carbonylation catalyst, i.e. compounds of the iron group, should be so chosen that this catalyst is homogeneously dissolved in the working liquid, constituted by the organic solvent, the alcohol and, if necessary, a small amount of water. It has finally been established by us that the catalysts should be activated by dissolving in the working liquid a small amount of a soluble copper halide.

As starting materials for our process we may use nonolefinic alcohols of the aliphatic, araliphatic and cycloaliphatic series, preferably those containing in addition to carbon and hydrogen only oxygen atoms. To cite a few examples we mention methanol, ethanol, the butanols, octanols and higher fatty alcohols having straight and branched chains. Even the higher members of this group, e.g. octadecanol, react surprisingly well. Cyclohexanol, methyl cyclohexanol, benzyl alcohol and phenylethyl alcohol are likewise good starting materials. Polyalcohols, like ethylene, propylene and butylene glycols and other polymethylene glycols, dihydroxy cyclohexanes, glycerol, pentaerythritol, trimethylol propane and their partial ethers with monoalcohols of the type referred to above are suitable starting materials. The process may also be used to convert phenols into acrylates, for example phenol itself, the cresols, xylenols and higher alkylated phenols, e.g. isobutyl and issooctyl phenol.

As organic solvents we prefer oxygen-containing, preferably water-miscible liquids which are inert under the reaction conditions, i.e. which are not irreversibly changed by the presence of alcohols or water and not able to react with acetylene or carbon monoxide. The solvents, therefore, should not contain free hydroxy, mercapto or carboxy groups, olefinic or acetylenic linkages, or primary or secondary amino groups. Their boiling point should preferably be below that of the acrylic acid ester to be prepared. Preferred solvents for our process are cyclic ethers, such as tetrahydrofurane, -pyrane and 1.4-dioxane, furthermore fully saturated aliphatic ketones, such acetone, methyl ethyl and diethyl ketone. Another group of solvents consists of cyclic esters and amides, such as butyrolactone or N-lower alkyl-lactames, in particular N-alkyl-pyrrolidones, such as the methyl and ethyl compound. Tetrahydrofurane, whenever available, is a very satisfactory solvent, since it has a relatively low boiling point and a high dissolving power for acetylene, and is otherwise absolutely inert. It may be easily and cheaply recovered and used again.

While in our process it is possible to work with a slight excess of the solvent, e.g. 60 parts by volume for 40 parts of alcohol, we prefer to employ much higher excesses of the organic solvent in the working liquid. We suggest to have from 75 to 95 percent by volume of the solvent and from 25 to 5 percent of alcohol. Solvents, especially tetrahydrofurane, with up to from 10 to 15 percent of water are quite satisfactory since they facilitate the solution of the catalyst. It is also possible to work with mixtures of two or more organic solvents.

The catalysts used in performing our invention are the metals of the iron group employed in the form of compounds. While both iron and cobalt show carbonylation activity which makes them potential technical catalysts, we prefer to work with nickel catalysts. Since the catalysts should in any case contain halogen either in a free or in a chemically combined form, the simplest way is to use the halides, especially nickel chloride, bromide and iodide. We may also use metal carbonyls prepared per se, provided there is present halogen, e.g. free bromine, hydrogen bromide, halides of other metals and the like. Thus, mixtures of nickel, cobalt or iron carbonyls in combination with other metal halides are workable catalysts. We may also build up our catalyst from several metals of the iron group. We may also use the metal halides in the form of complex compounds with quaternary ammonium or phosphonium halides.

As activators we use soluble copper compounds. Since the reaction has to be carried out in the presence of halogen, it is preferred to use the copper as a halide, e.g. chloride, bromide or iodide. Copper sulfate, acetate, propionate and other water-soluble salts may be used together with halide ions. Sometimes it has been found useful to add a small amount (less than 1 percent by weight) of powdered copper. However, the process works generally quite satisfactorily without it. Furthermore, a small amount of a conventional polymerization inhibitor is useful.

The amount of catalyst required is relatively small and depends to some extent on the kind of metal, which compound thereof is used, and on the composition of the working liquid. Generally speaking, the concentration is preferably in the range of from 0.05 to 2 percent by weight of the metal of the iron group, calculated on the alcohol or phenol. The amount of the copper compound used as an activator may be in the same range. As a rule, it may be somewhat lower than that of the catalyst and as low as 0.02 percent of copper in the form of a halide.

Generally speaking, there is no difficulty in dissolving the above defined amounts of the catalysts in the reaction mixture so that during the whole process there is a homogeneous solution of the catalyst. By adding a small amount of water, say up to 15 percent calculated on the weight of the alcohol or phenol, the solubility of the catalyst may be increased, if necessary. In spite of the presence of water, the formation of free acrylic acid, as a rule, is less favored than that of its esters. Nevertheless we may prepare mixtures of the esters with free acids according to our invention, if so desired.

The reaction conditions used in the carbonylation are within the conventional range. We prefer to use acetylene and carbon monoxide in substantially equimolecular ratios, but the $C_2H_2$:CO ratio may vary within wide limits, e.g. between 0.5:1 to 1:0.5. When working with a circulating gas a 1:1 ratio is of advantage to avoid an accumulation of the excess component in the circulating gas.

The working temperature is in the range of 150° to 250° C., in particular between 170° and 220° C. The carbonylation requires the use of increased pressure. While in principle we may work at pressures exceeding 5 atmospheres we found it more economic to ensure a high conversion rate by applying at least 20 up to 60 atmospheres and an individual partial pressure for acetylene and carbon monoxide of at least 10 atmospheres. Pressure above 60 atmospheres, e.g. 70 to 90 atmospheres, may also be used. However, the precautions necessary in this range are generally so expensive that the gain in higher conversion is more than cancelled.

The reaction may be carried out batchwise or continuously. In a continuous process we may either work according to the trickling method by leading the working liquid downwards through a reactor charged with filler bodies while leading the gas mixture in the same or opposite direction. We may as well introduce liquid gases at the bottom of a reactor and withdraw the mixture at the top thereof. The recovery of acrylic acid esters from the reaction liquid is carried out either by extraction or by fractional distillation. In this stage as well as during the carbonylation stage proper we may add the conventional polymerization inhibitors.

The following examples will further illustrate how this invention may be carried out in practice.

*Example 1*

A stirring autoclave made from stainless steel and provided with external electrical heating is charged with 2000 cubic centimeters of tetrahydrofurane, 400 cubic centimeters of n-butanol, 120 cubic centimeters of water, 5 grams of nickel bromide, 4 grams of copper bromide and 1 gram of hydrogen bromide. After having replaced the air by nitrogen a mixture of equal parts by volume of acetylene and carbon monoxide under 25 atmospheres is pressed in and the whole heated slowly. When reaching a temperature of 187° C. and a pressure of 44 atmospheres the reaction starts. The temperature is kept at 187° C. and the pressure maintained by replenishing the acetylene-carbon monoxide mixture. After about 500 liters of the gas mixture have been consumed in the course of half an hour the reaction is discontinued. The reaction liquid contains 22.6 percent of butyl acrylate, 14.9 percent of acrylic acid and 1.7 percent of n-butanol. Thus 313 grams of the butanol have been converted to 540 grams of butyl acrylate. The amount of free acrylic acid is 360 grams. The conversion of butanol to butyl acrylate is 97 percent, the conversion of water to acrylic acid almost 75 percent.

*Example 2*

A mixture of 1580 grams of tetrahydrofurane, 644 grams of n-butanol, 20 grams of water, 5 grams of nickel bromide and 4 grams of copper bromide is treated in the manner described in Example 1 at 180° to 196° C. and under a pressure of 35 to 40 atmospheres. About 500 liters of the acetylene-carbon monoxide mixture are consumed in half an hour. The reaction liquid contains 36.2 percent of butyl acrylate and 4.32 percent of free acrylic acid, corresponding to a total amount of 1010 grams of butyl acrylate and 134 grams of free acrylic acid.

*Example 3*

A shaking autoclave made from stainless steel is charged with a solution of 17.5 grams of ethanol in 51.8 grams of tetrahydrofurane which also contains 0.16 gram of nickel bromide, 0.1 gram of copper bromide and 0.3 gram of water. After having replaced the air by nitrogen a mixture of equal parts by volume of acetylene and carbon monoxide is pressed in under a pressure of 24 atmospheres and the autoclave is heated. Between 180° and 200° C. and under 35 to 50 atmospheres about 18 grams of the gas mixture are consumed. The reaction liquid contains 2.1 percent of acrylic acid, 39 percent of ethyl acrylate and 1.7 percent of ethanol. The rate of conversion of ethanol to ethyl acrylate therefor is over 90 percent.

*Example 4*

In the manner described in Example 1 a mixture of 2000 cubic centimeters of tetrahydrofurane, 500 cubic centimeters of methanol, 10 cubic centimeters of water, 4 grams of nickel bromide and 3 grams of copper bromide is treated at 185° to 200° C. under 36 to 50 atmospheres with acetylene and carbon monoxide. In the course of half an hour 500 liters of the gas have been consumed. The weight of the reaction mixture has increased by 450 grams. The liquid then contains 1.4 percent of free acrylic acid, 33 percent of methyl acrylate and 3.6 percent of unconverted methanol. The conversion of the methanol to methyl acrylate amounts to over 85 percent.

*Example 5*

Through a vertical stainless high pressure tube there is continuously circulated upwards a mixture of 30 liters of tetrahydrofurane, containing 12 percent of water, 15 grams of nickel bromide, 8 grams of copper bromide and 20 grams of hydrogen bromide, under a pressure of 48 atmospheres by continuously circulating a mixture consisting of equal parts by volume of acetylene and carbon monoxide. While maintaining an average reaction temperature of 200° C. the reaction liquid emerging from the reaction tube is continuously released from pressure and distilled. It contains 18 percent of acrylic acid. After two hours 2 to 2.5 kilograms of methanol are pressed into the reaction tube in addition to the aqueous tetrahydrofurane solution. The temperature then rises to 210° C. and the gas consumption to 5.4 normal cubic meters per hour. After 3 hours the reaction product contains 12 percent of acrylic acid and 9 percent of acrylic acid methyl ester. The reaction is continued for another 24 hours without a substantial change in the composition of the reaction mixture.

*Example 6*

In the manner described in Example 3 a mixture of 30 grams of phenol, 62 cubic centimeters of tetrahydrofurane, a solution of 0.2 gram of nickel bromide and 0.1 gram of copper chloride in 0.5 cubic centimeter of water is treated at 195° to 200° C. and under a pressure of 40 to 50 atmospheres with acetylene and carbon monoxide. There is obtained a reaction mixture which contains 4.68 grams of free acrylic acid and 4.5 grams of phenyl acrylate.

*Example 7*

A mixture of 20 grams of hydroquinone, 90 cubic centimeters of tetrahydrofurane in a solution of 0.3 gram of nickel bromide and 0.1 gram of copper bromide in 0.5 cubic centimeter of water is heated in a shaking autoclave made from stainless steel to 182° to 192° C. while pressing in a mixture of equal parts by volume of acetylene and carbon monoxide under from 38 to 50 atmospheres. After about 3 hours the reaction is discontinued and the reaction liquid subjected to distillation.

First the tetrahydrofurane is distilled off and the distillation residue is washed with a small amount of water and recrystallized from methanol. 41 grams of hydroquinone-bis-acrylate are thus obtained. It melts at 81° C. By heating the melt of the ester slowly suddenly the ester polymerizes to a water-clear glassy mass.

*Example 8*

In the manner described in Example 3 a mixture of 25 grams of dodecanol, 80 cubic centimeters of tetrahydrofurane, 0.3 gram of nickel bromide, 0.2 gram of copper bromide and 1 cubic centimeter of water is treated at 200° C. for 2 hours with an equal mixture of acetylene and carbon monoxide under 40 to 51 atmospheres. By distilling the reaction liquid in the manner described in Example 7, 31 grams of pure dodecyl acrylate are obtained.

*Example 9*

A mixture of 450 grams 1.4-butylene glycol, 2100 cubic centimeters of tetrahydrofurane, 5 grams of nickel bromide, 3 grams of copper bromide and 5 cubic centimeters of water is treated in the manner described in Example 1 for 1 hour at 192° to 200° C. with acetylene and carbon monoxide under 50 atmospheres pressure. The reaction mixture takes up 510 grams of acetylene and carbon monoxide. It contains about 800 grams of butanediol-1.4-bis-acrylate besides 70 grams of free acrylic acid.

When repeating this experiment with a mixture of 6 grams of nickel iodide and 3 grams of copper bromide a reaction mixture is obtained which contains about 850 grams of butanediol-1.4-bis-acrylate besides 70 grams of free acrylic acid.

*Example 10*

A shaking autoclave made from stainless steel is charged with 90 cubic centimeters of dioxane, 30 cubic centimeters of ethanol and a solution of 0.4 gram of nickel bromide and 0.2 gram of cuprous iodide in 1 cubic centimeter of water and a small amount of hydroquinone. After having replaced the air by nitrogen a mixture of equal parts by volume of acetylene and carbon monoxide under 25 atmospheres' pressure is pressed in, the autoclave heated and the gas pressure increased to 46 atmospheres. At 190° C. the reaction starts. While maintaining a pressure of between 40 and 50 atmospheres in the autoclave by replenishing the mixed gas consumed, the reaction proceeds smoothly in the course of 2 and a half hours. When working up the reaction mixture by distillation there is obtained besides 5.7 grams of free acrylic acid 51 grams of ethyl acrylate, corresponding to a practically quantitative conversion of the ethanol.

*Example 11*

In the manner described in Example 10 a mixture of 90 cubic centimeters of acetone, 36 cubic centimeters of ethanol, 0.3 gram of nickel bromide, dissolved in 1 cubic centimeter of water, 0.2 gram of cuprous iodide and a small amount of hydroquinone is treated during 3 hours at 190° to 195° C. with acetylene and carbon monoxide. The reaction mixture is subjected to distillation. 4.3 grams of acrylic acid and 41 grams of ethyl acrylate are obtained.

*Example 12*

In the manner described in Example 10 a mixture of 50 cubic centimeters of acetone, 30 cubic centimeters of n-butanol, 0.2 gram of nickel chloride, 0.5 gram of cuprous iodide, 1 cubic centimeter of water and a small amount of hydroquinone is treated at 192° to 198° C. with acetylene and carbon monoxide under pressure. From the reaction mixture there are obtained by distillation 32.4 grams of butyl acrylate and 2.8 grams of free acrylic acid.

We claim:
1. In the process for the production of acrylic acid esters by the interaction of acetylene and carbon monoxide with non-olefinic oxygen compounds at elevated temperature in the range of about 150° C. to about 250° C. and under superatmospheric pressure in the range of about 5 to about 90 atmospheres in the presence of a solvent and a carbonylation catalyst based on a metal of the iron group the step which comprises carrying out the reaction in the presence of an excess by volume of an inert solvent containing in homogeneous solution a catalytic amount of a nickel halide catalyst and as an activator a salt of copper that is soluble in the reaction medium.

2. A process as set forth in claim 1 wherein a nickel halide is used as the catalyst and a copper halide as the activator.

3. A process as set forth in claim 1 wherein nickel bromide is used as the catalyst and a copper halide as the activator.

4. A process as set forth in claim 1 wherein nickel bromide is used as the catalyst and copper bromide as the activator.

5. In the process for the production of acrylic acid esters by the interaction of acetylene and carbon monoxide with non-olefinic oxygen compounds at elevated temperature in the range of about 150° to about 250° C. and under superatmospheric pressure in the range of about 5 to about 90 atmospheres in the presence of a solvent and a carbonylation catalyst based on a metal of the iron group the step which comprises carrying out the reaction in the presence of an excess by volume of tetrahydrofurane containing in homogeneous solution a catalytic amount of nickel bromide and as an activator a copper halide.

6. A process as set forth in claim 5 wherein a non-olefinic aliphatic alcohol is used as starting material.

7. A process as set forth in claim 5 wherein a phenol is used as starting material.

8. The process for the production of acrylic acid alkyl esters which comprises, treating with acetylene and carbon monoxide at temperatures between 170° and 220° C. and under pressures exceeding 5 atmospheres and not exceeding about 90 atmospheres non-olefinic unsubstituted saturated aliphatic alcohols in the presence of an excess by volume of an inert oxygen-containing organic solvent having a lower boiling point than the acrylic acid ester formed and having dissolved therein homogeneously a catalytic amount of nickel bromide and a copper halide.

9. The process as set forth in claim 8 wherein tetrahydrofurane is used as the solvent.

10. The process as set forth in claim 8 wherein tetrahydrofurane is used as the solvent and n-butanol is used as the alcohol.

11. The process as set forth in claim 8 wherein tetrahydrofurane is used as the solvent and ethanol is used as the alcohol.

12. The process as set forth in claim 8 wherein acetone is used as the solvent.

13. The process for the production of acrylic acid phenyl esters which comprises treating with acetylene and carbon monoxide at temperatures between 170° and 220° C. and under pressures exceeding 5 atmospheres and not exceeding about 90 atmospheres mononuclear phenols in the presence of an excess by volume of an inert oxygen-containing organic solvent having a lower boiling point than the acrylic acid ester formed and having dissolved therein homogeneously a catalytic amount of nickel bromide and of a copper halide.

14. A process as set forth in claim 13 wherein tetrahydrofurane is used as the solvent.

References Cited in the file of this patent

UNITED STATES PATENTS 2,582,911   Neher et al. _____ Jan. 15, 1952

FOREIGN PATENTS 854,948   Germany _____ Nov. 10, 1952

OTHER REFERENCES

Copenhaver et al.: "Acetylene and Carbon Monoxide Chemistry" (1949), pp. 255–6, 295–7.